United States Patent [19]

McEvoy et al.

[11] Patent Number: 4,519,494
[45] Date of Patent: May 28, 1985

[54] EGG HANDLING SYSTEM

[75] Inventors: John C. McEvoy; Leslie P. Thomas, both of Canton, Mich.

[73] Assignee: Diamond Automations, Inc., Framington, Mich.

[21] Appl. No.: 394,161

[22] Filed: Jul. 1, 1982

[51] Int. Cl.³ .............................................. B65G 47/19
[52] U.S. Cl. .................................... 198/448; 198/432; 209/513
[58] Field of Search ............... 198/387, 400, 624, 534, 198/779, 479, 424, 432, 433, 448, 611, 688, 370; 294/87.12; 209/512, 513

[56] References Cited

U.S. PATENT DOCUMENTS

| | | | |
|---|---|---|---|
| 1,669,087 | 5/1928 | Hungerford | 198/400 |
| 2,648,430 | 8/1953 | Wilson | 209/512 |
| 2,830,531 | 4/1958 | Tarlton | 198/779 |
| 3,144,121 | 8/1964 | Smith . | |
| 3,224,610 | 12/1965 | Scollard et al. | 198/377 |
| 3,300,021 | 1/1967 | Holmes . | |
| 3,369,644 | 2/1968 | Niederer . | |
| 3,461,459 | 8/1969 | Willsey et al. . | |
| 4,036,355 | 7/1977 | Valli | 198/688 |

FOREIGN PATENT DOCUMENTS

| | | | |
|---|---|---|---|
| 2418758 | 11/1979 | France | 198/534 |
| 1031334 | 6/1966 | United Kingdom | 198/688 |

Primary Examiner—Joseph E. Valenza
Assistant Examiner—Kyle E. Shane
Attorney, Agent, or Firm—Kenyon & Kenyon

[57] ABSTRACT

An egg handling system for an egg grader in which eggs carried by a conveyor in spaced-apart, aligned pairs are released at a receiving station into at least one rotating resilient cylinder for transfer to an egg packer. A support member is disposed below the rotating cylinder for guiding eggs delivered to the cylinder downwardly and away from the cylinder to the egg packer.

34 Claims, 8 Drawing Figures

EGG HANDLING SYSTEM

BACKGROUND OF THE INVENTION

1. Field of the Invention

This invention relates generally to an egg handling system, and in particular to an apparatus for handling eggs delivered to a receiving station in an egg grader in which individual eggs are classified and packaged in accordance with their physical characteristics, including weight.

2. Description of the Prior Art

Generally speaking, egg processing systems in which eggs having the same size, weight, etc. are delivered to separate receiving stations for packing into egg cartons are known in the art. In the processing of eggs, one important component of the processing system is an egg grader by means of which each of the eggs being processed is classified or graded in accordance with its particular physical characteristics including the weight or size of the egg. Generally, included in the egg grading process is a candling operation by which defects such as blood spots, dirt stains, rough spots, shell cracks or other defects are identified. In addition, as part of the grading process each egg is weighed in order to determine its size for ultimate packing with other eggs of a generally similar weight and size. In this respect the eggs are weighed in order to facilitate packing in accordance with established weight ranges specified by governmental agencies. Eggs are generally classified into designated classifications, dependent on weight, such as small, medium, large and extra large. In addition, classifications such as peewee and jumbo are utilized for those eggs not falling within the aforementioned weight classifications.

In an egg grader performing the foregoing operations, limitations exist for the performance of the machine which in turn dictate the maximum operating speed for an entire automated egg processing system. In order to improve the operating efficiency of such egg processing systems, the speed at which the egg grader of such a system operates must be increased, which requires the handling system to have a high-speed response time and yet maintain accurate separation and packaging of the respective eggs.

SUMMARY OF THE INVENTION

It is therefore an object of the present invention to provide an improved egg handling system which is capable of handling eggs delivered to a receiving station in an egg processing system at a high speed of operation while maintaining accurate separation and packaging of eggs having the same physical characteristics.

It is also an object of the present invention to provide an improved egg handling system for transferring eggs carried by a first high-speed conveyor, in either single or multiple rows, to a second slower-speed conveyor.

It is still another object of the present invention to provide an improved egg handling system which enables eggs to be released over a wide area of a receiving station in order to prevent eggs successively dropped at the receiving station from striking one another.

It is a further object of the present invention to provide an improved egg handling system in which eggs released from a high-speed conveyor are caught by a resilient rotatable cylinder which reduces the speed of each falling egg and gently guides the eggs toward a second conveyor.

It is also an object of the present invention to provide an improved egg handling system which is capable of evenly distributing eggs released from the first conveyor in a plurality of channels provided in the second conveyor disposed adjacent the receiving station.

These and other objects of the invention are achieved in an apparatus for transferring eggs continuously conveyed in spaced-apart, aligned relationship by a conveyor means to a receiving station in an egg grading apparatus at which the eggs are collected and packaged according to their physical characteristics. The apparatus comprises conveyor means including carrier members coupled thereto for conveying adjacently spaced rows of eggs in a spaced-apart aligned relationship and includes at least one rotatable, resilient receiving means disposed at the receiving station below the conveyor means and has a peripheral edge thereof disposed at the approximate centerline of the adjacently spaced rows of eggs. The receiving means are adapted for rotational movement downwardly and away from the conveyor means for receiving eggs delivered by the conveyor means to the receiving station. The apparatus further incorporates support means, disposed below the rotatable, resilient receiving means, for guiding eggs delivered to the receiving means downwardly and away from the receiving means.

These and other objects of the invention are also achieved in a method of transferring eggs delivered in spaced-apart aligned relationship by a first conveyor to a receiving station, comprising the steps of delivering eggs to the receiving station in parallel spaced-apart rows on a conveyor means, releasing eggs from the conveyor means at the receiving station in accordance with a predetermined requirement and positioning a rotatable resilient receiving means below the conveyor means so as to receive therein and deliver to a common member the eggs released from the parallel spaced-apart rows of the conveyor means. The method also comprises the steps of receiving the eggs in the rotatable, resilient receiving means disposed at the receiving station, rotating the resilient receiving means downwardly and away from the conveyor means to urge the received eggs downwardly, and guiding the eggs received in the receiving means downwardly and away from the receiving means. In one aspect of the invention, eggs are conveyed in side-by-side relationship and delivered to a common receiving means.

These and other novel features and advantages of the invention will be described in greater detail in the following detailed description.

DETAILED DESCRIPTION

Figure 1:
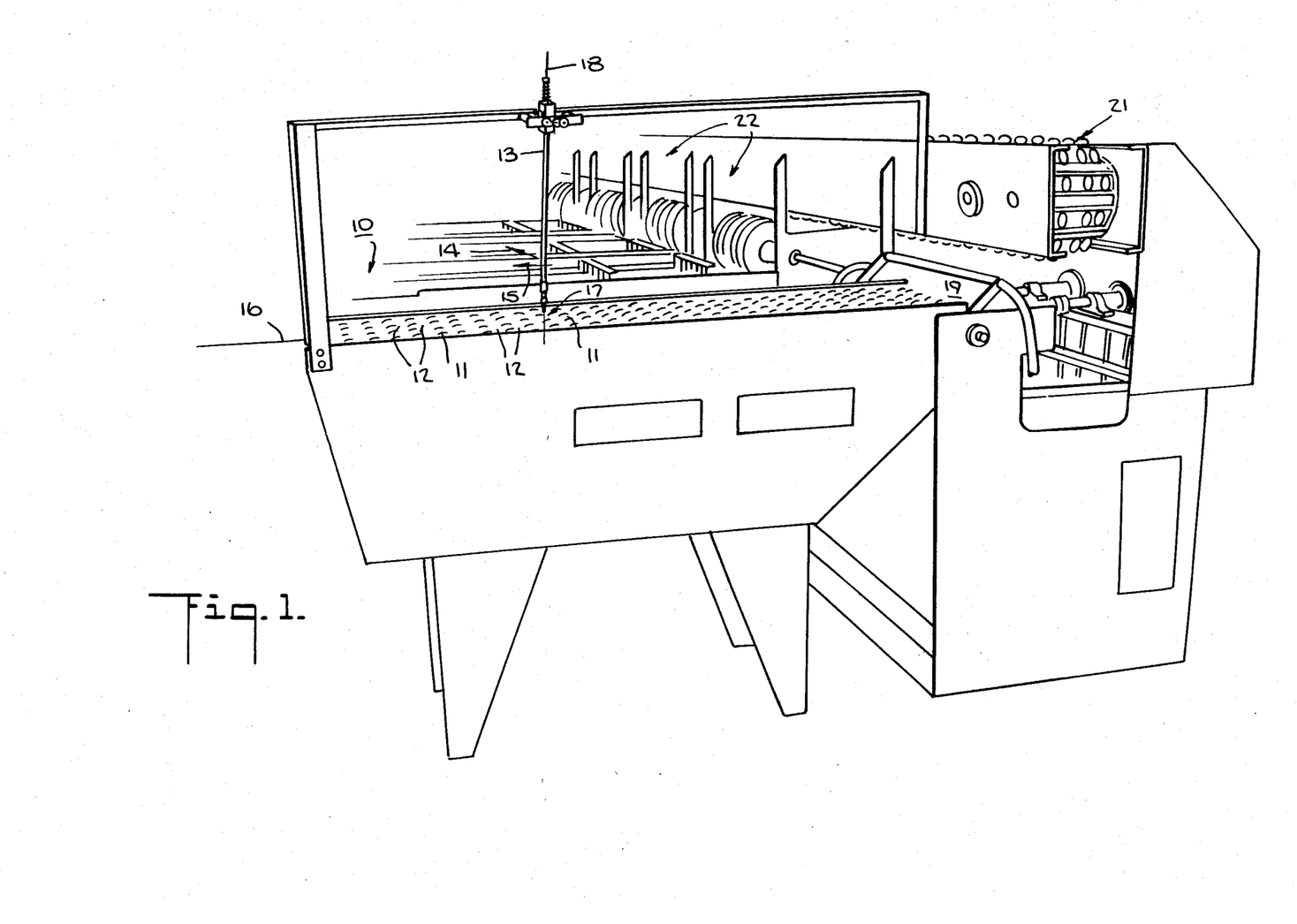
FIG. 1 is a perspective view of an egg grading system utilizing the improved egg handling system of the present invention.

Referring now to the drawings, and in particular to FIG. 1, the egg handling system of the present invention is described in conjunction with an egg processing system, portions of which are disclosed in copending applications entitled "Egg Processing System", "Egg Transfer System", "Egg Carrier", and "Article Coding and Separating System", Ser. Nos. 394,162, 394,443, 394,430 and 394,444, respectively, filed simultaneously herewith, the disclosures of which are specifically incorporated herein by reference.

In the egg grading system, eggs are directed through an egg candling station 10 in which the defective eggs, for example, those having shell cracks, dirt stains, blood spots, rough spots or the like, are identified. This system is more specifically described in the foregoing copending application Ser. No. 394,444, entitled "Article Coding and Separating System". Briefly, in the candler, a mass of eggs 11 to be processed in the egg grader are conveyed by a spool bar conveyor including a plurality of spool bars 12 over a high-intensity light source (not shown) to enable the visual detection of blood spots, dirt stains, shell cracks, rough spots and the like by an operator standing adjacent to the candler. The movable spool bars 12, which comprise a plurality of concave, rotatable cylinders rotatably mounted on spaced-apart, parallel axles driven at their ends in conveyor-fashion by parallel chain drives, and between which the eggs are disposed, convey eggs 11 through the candler 10 in spaced-apart, aligned relationship, i.e., in aligned columns and rows over the high-intensity light source of the system. In the illustrated embodiment of the invention, the eggs are aligned in six parallel longitudinal columns on the spool bars for passage through the candler and over the light source used to generate light beneath the spool bars and the eggs so as to enable visual detection of defects.

An elongated movable pointer 13 is pivotally disposed vertically depending above spool bars 12. Pointer 13 is pivotally mounted at its upper end so as to be movable over a selected area or plane of the candler above the spool bars 12 in mutually orthogonal directions parallel to the longitudinal axis 16 of the spool bar conveyor and perpendicular to longitudinal axis 16, i.e., in directions parallel to the columns and rows of eggs 11 on spool bars 12. The vertical lower end 17 of pointer 13 is disposed adjacent spool bars 12 and is axially movable along its longitudinal axis 18 so that lower end 17 is movable into and out of engagement with the shells of eggs disposed on spool bars 12 within the selected area of the candler on spool bars 12 over which pointer 13 is movable. As is more fully described in the foregoing copending application entitled "Egg Processing System", defective eggs identified by the operator are first conveyed through the candler 10 and then to an egg weighing station 19, and then by means of an egg transfer and conveyor system 21 to a plurality of egg packing stations 22.

Figure 2:
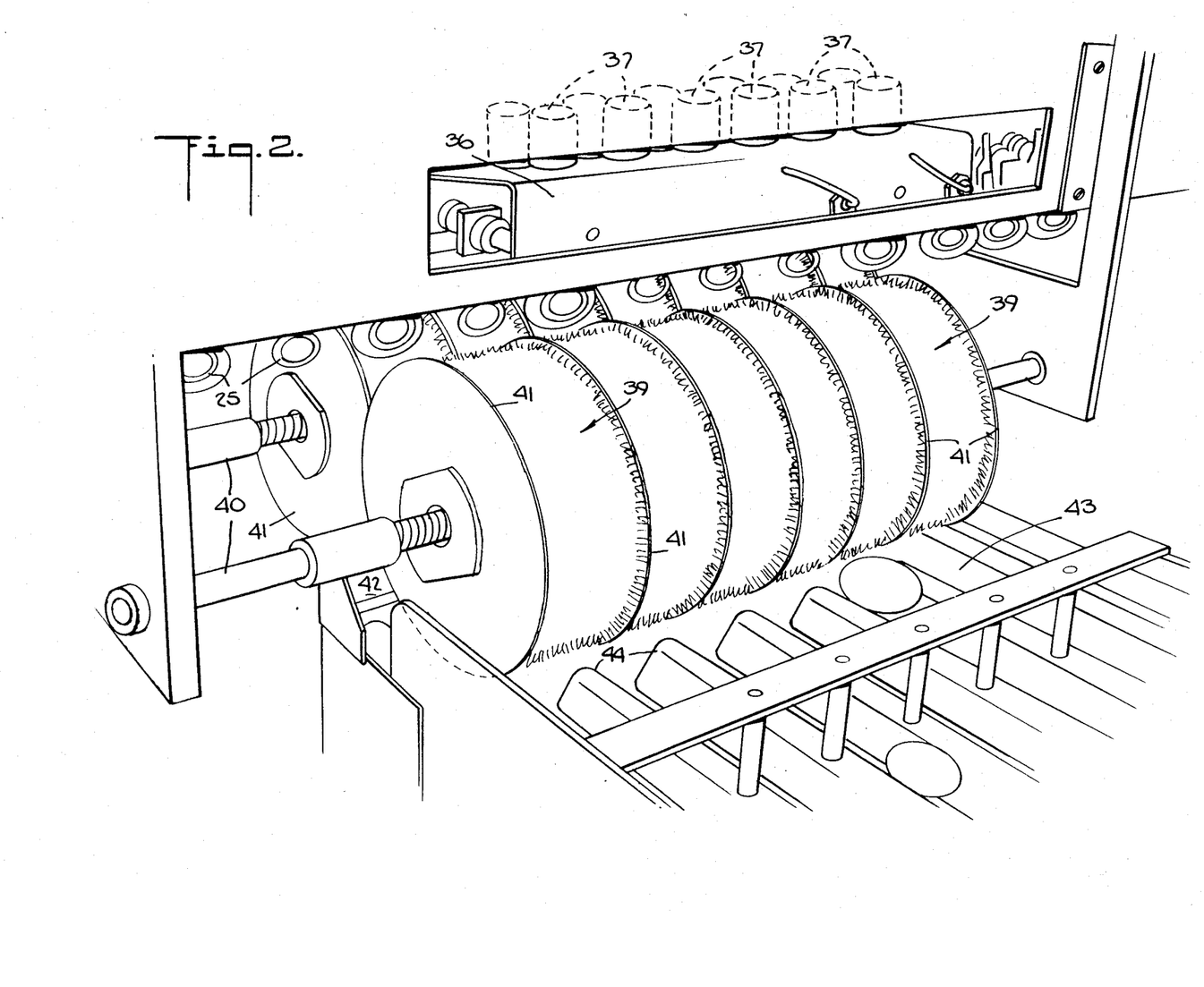
FIG. 2 is a perspective view of the receiving station of an egg grading system utilizing one embodiment of the improved egg handling system of the present invention.
Figure 3:
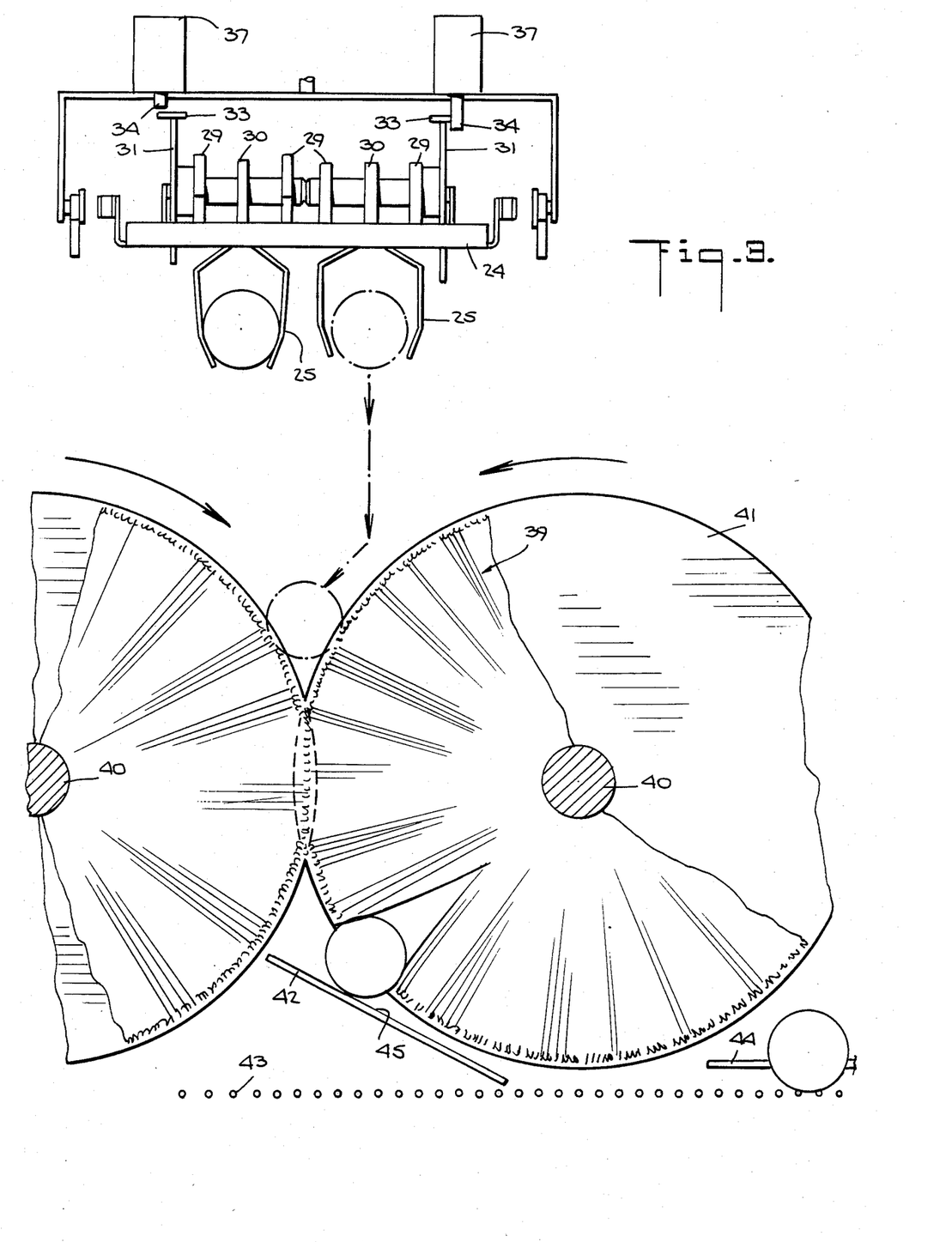
FIG. 3 is a cross-sectional view of the receiving station illustrated in FIG. 2.
Figure 4:
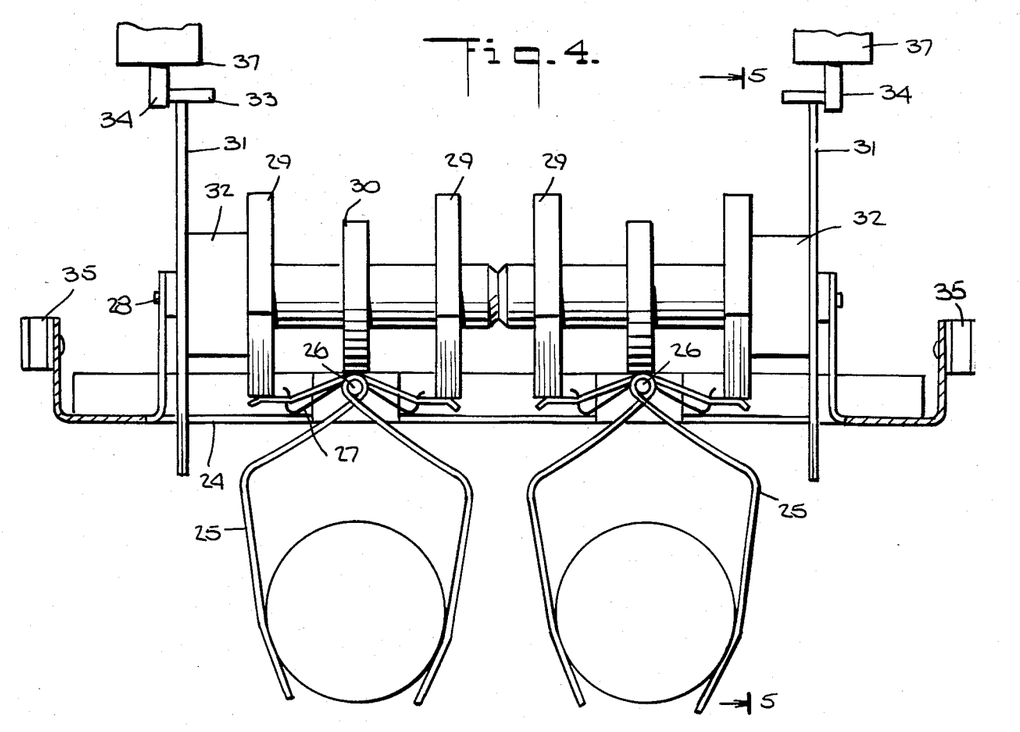
FIG. 4 is a cross-sectional view of the egg conveyor at the receiving station illustrated in FIG. 2.

Referring now to FIGS. 2, 3 and 4, the receiving station of the egg grader receives eggs carried in side-by-side relationship by a continuously moving conveyor, which includes a high-speed conveyor, including a plurality of carriage assemblies 23 for carrying the eggs, the details of which are described in the foregoing copending patent application entitled "Egg Carrier". Briefly, each carriage assembly includes a sheet metal platform 24 on which a pair of depending prongs or egg-engaging members 25 are mounted. Prongs 25 are pivotably mounted and are positioned opposite one another in order to engage an egg therebetween across its smaller side or width. The lower portion of the prongs are curved so as to approximate the curvature across the smaller width of an egg. The upper portion of each prong is reversely bent so as to provide a surface having a generally horizontal orientation. As illustrated in FIG. 4, this bent portion of the prong is mounted on a fixed shaft 26 so as to be pivotably movable with respect thereto. The opposing prong is similarly mounted over shaft 26 so that a pair of operative prongs 25 open and close with respect to one another. A spring 27 is wound with one end thereof about fixed shaft 26 and the free end thereof in engagement with the generally horizontal portion of prong 25.

Figure 5:
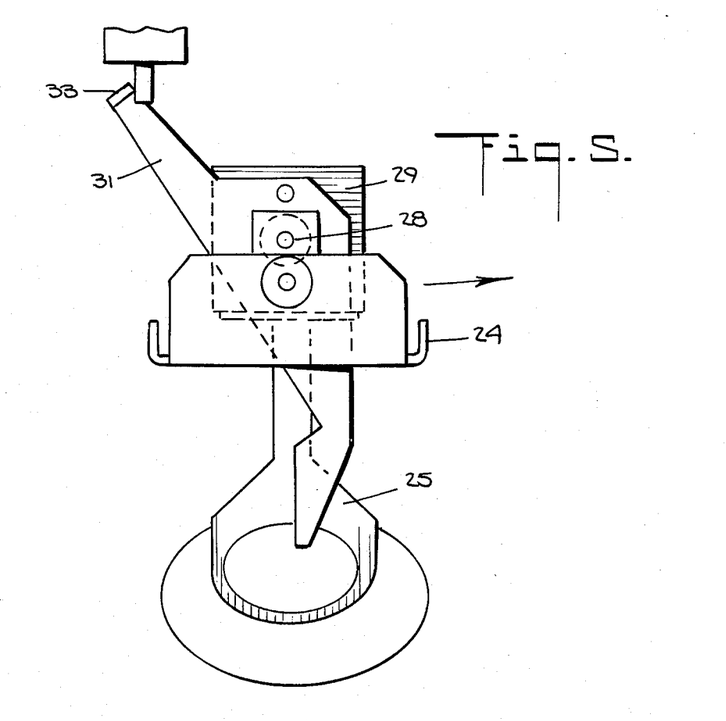
FIG. 5 is a longitudinal cross-sectional view of the egg conveyor at the receiving station taken along Section 5—5 of FIG. 4.

The fixed mounting shaft 28 is, as shown in FIG. 5, positioned on platform 24 generally perpendicular with respect to fixed shafts 26. A plurality of cam members 29 having a generally square profile are pivotably mounted on shafts 28 and each have an operative flat bottom surface disposed in engagement with the horizontal surface of an egg-engaging prong 25. An integral spacer 30 is disposed between adjacent cams 29 in order to maintain the proper spacing and engagement of the horizontal cam engaging surface with the horizontal surface of the egg-engaging prongs 25.

Coupled to each of cam members 29 is an extension bar 31 which is spaced from the end of the cam member 29 by an integral spacer 32. Extension bar 31 is provided with an upper T-shaped portion 33 which is engageable by a solenoid-actuated plunger 34 in order to actuate rotational movement thereof about shaft 28. Each extension bar is fastened or directly coupled to the adjacent spacer 32, cam 29, intermediate spacer 30, and the adjacent cam 29. In this manner, each pair of egg-engaging prongs 25 is operated independently of the other although mounted on common shaft 28.

A plurality of the carriage assemblies 23 convey the eggs in spaced-apart, aligned relationship to the receiving station of the egg grader and are coupled to common chain members 35 on each side of the conveyor which drive the carriage assemblies. At each receiving station, a frame 36 (see FIG. 2) on which solenoids 37, which activate plungers 34, are mounted, is located adjacent the chain members 35. Frame 36 is disposed over a pair of rotatable resilient cylinders 39 which are coaxially mounted on spaced drive shafts 40. In the embodiment of the invention illustrated in FIGS. 2-3, the cylinders comprise cylindrical brushes, preferably fabricated from nylon bristles. A plurality of rotatable disks 41 are mounted on shafts 40 in order to define a plurality of channels in the cylinders for receiving eggs from the carriage assemblies. The cylinders are disposed vertically below frame 36 and carriage assemblies 23 and have their peripheral ends engaging and in slight interference with those of the adjacent cylinder. The peripheral ends of the forwardmost cylinder 41 is further disposed in a generally contiguous relationship with an elongated, flexible support member 42, which may comprise a sheet of plastic, such as mylar, stretched over and mounted on a frame (not shown) extending axially along substantially the entire length of the cylinders. A conveyor belt 43, which may comprise a wire conveyor or a plurality of elongated strand members moving axially along the length of the conveyor, is disposed below the cylinders and the support member for conveying eggs received therefrom to an egg packer (not shown) which packs the eggs in cartons or trays as desired. Conveyor belt 43 is divided into a plurality of channels aligned with those formed in the cylinders by disks 41 by means of a plurality of elongated stationary guide members 44 (FIG. 2) which, in the illustrated embodiment of the invention, are disposed over the conveyor belt in close proximity thereto and have an inverted V-shaped profile (i.e., are upwardly convex). Suitable drive means, such as an electric motor, is coupled to shafts 40 for rotating the cylinders so that the peripheral edges thereof rotate in opposite directions inwardly towards each other and downwardly and away from carriage assemblies 23, i.e., in a counter-clockwise direction. As can be readily seen in FIG. 3, support member 42 is upwardly inclined toward the rearwardmost shaft 40 with respect to the direction of movement of conveyor 43, and its uppermost surface 45 is disposed beneath and slightly spaced from the peripheral edges of the forwardmost bristles of cylinders 39 in order to maintain contact between cylinders 39 and the eggs guided along member 42 onto conveyor 43. This surface may, if desired, be curved in a direction substantially in conformance with that of the forwardmost cylinder.

In operation, eggs are carried by the prongs 25 of carriage assemblies 23 as illustrated in FIG. 4 until they reach a receiving station of the egg grader. When the eggs arrive above the appropriate station, solenoids 37 are selectively actuated by any suitable means, e.g., as described in the foregoing copending application entitled "Egg Processing System." Plungers 34 of solenoids 37 engage the upper T-sections 33 of extension bars 31 and cause the bars to rotate in a counter-clockwise direction (i.e., in a direction opposite to that of their movement by the egg conveyor) about shaft 28, thereby releasing the eggs from the carriage assemblies. When plungers 34 are moved into the path of the carriage assemblies and engage T-sections 33 of the extension bars, the counter-clockwise rotation of the bars causes prongs 25 to pivot outwardly with respect to one another due to the force of springs 27 which urges prongs 25 toward their open position. The eggs are then released from the prongs, drop downwardly as shown in FIG. 3, and are caught by the cylinders 39 which reduce the speed at which the eggs fall and gently move the eggs downwardly and outwardly away from carriage assemblies 23 to support member 42 and into the channels of conveyor 43. The conveyor 43 generally operates at a speed which is substantially less than that of the carriage assembly conveyor.

Figure 6:
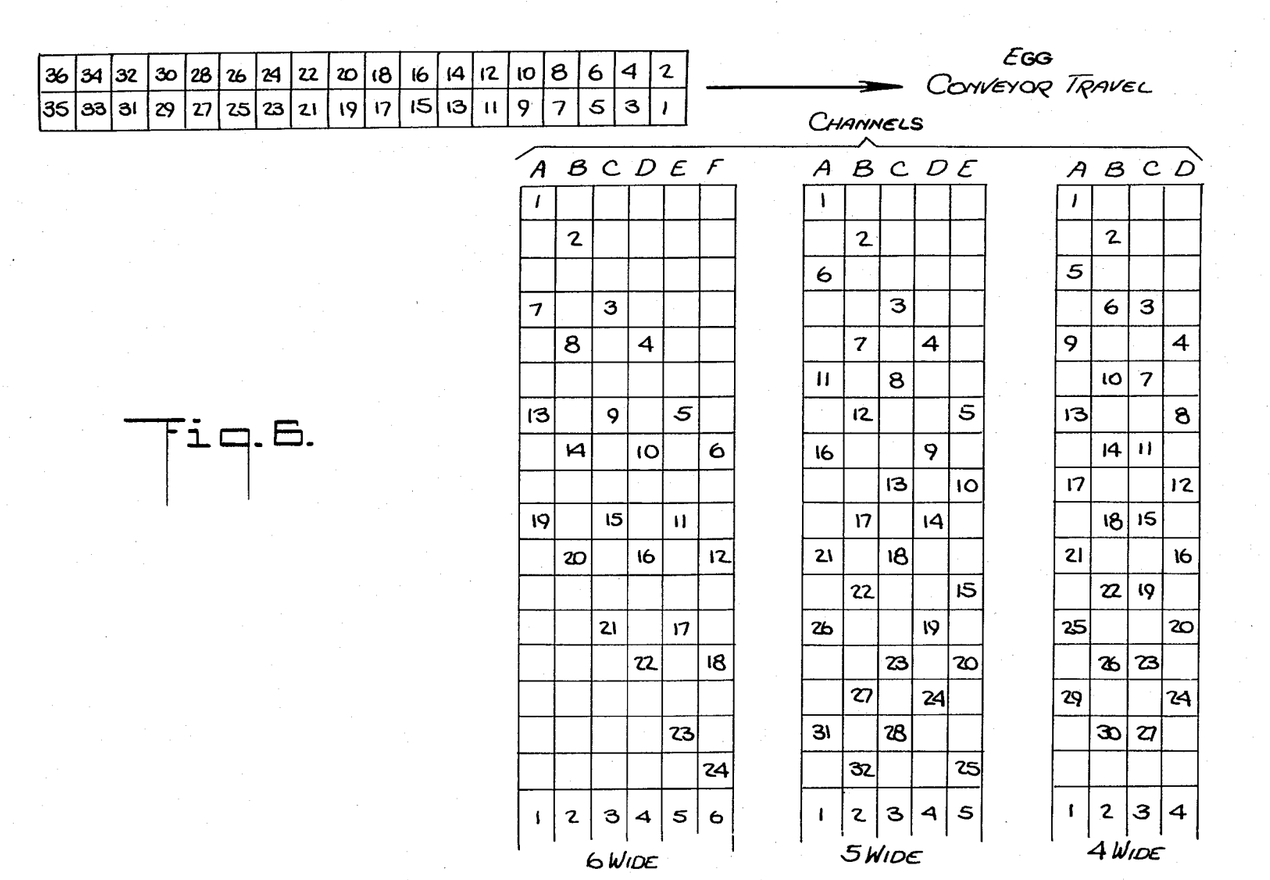
FIG. 6 is a schematic illustration of the sequence in which eggs are dropped from the egg conveyor of the egg grading system into the rotating, resilient cylinders of the handling system at the receiving station.

As shown in FIG. 6, release of the eggs from the carriage assemblies is selectively controlled so as to drop the eggs successively into the channels formed by disks 41 in cylinders 39 and members 44 on conveyor 43 beginning with the first such channel reached by the eggs as they are conveyed by carriage assemblies 23 to the receiving station. Sequences which may be used for six, five and four channels, respectively, are illustrated in the drawing. By releasing the eggs from the carriage assemblies into the cylinders 39 as described, i.e., over the entire axial length of the area of the cylinders available for receiving the eggs, an even distribution of the eggs is obtained in the channels of conveyor 53.

Generally speaking, all eggs which have been determined to have identical or similar physical characteristics are preferably dropped in the channels at one receiving station in the sequence illustrated in FIG. 6. For example, egg no. 1 will be dropped in channel A, egg no. 2 in channel B, etc. until all the channels have received an egg, whereupon the process is repeated.

Figure 7:
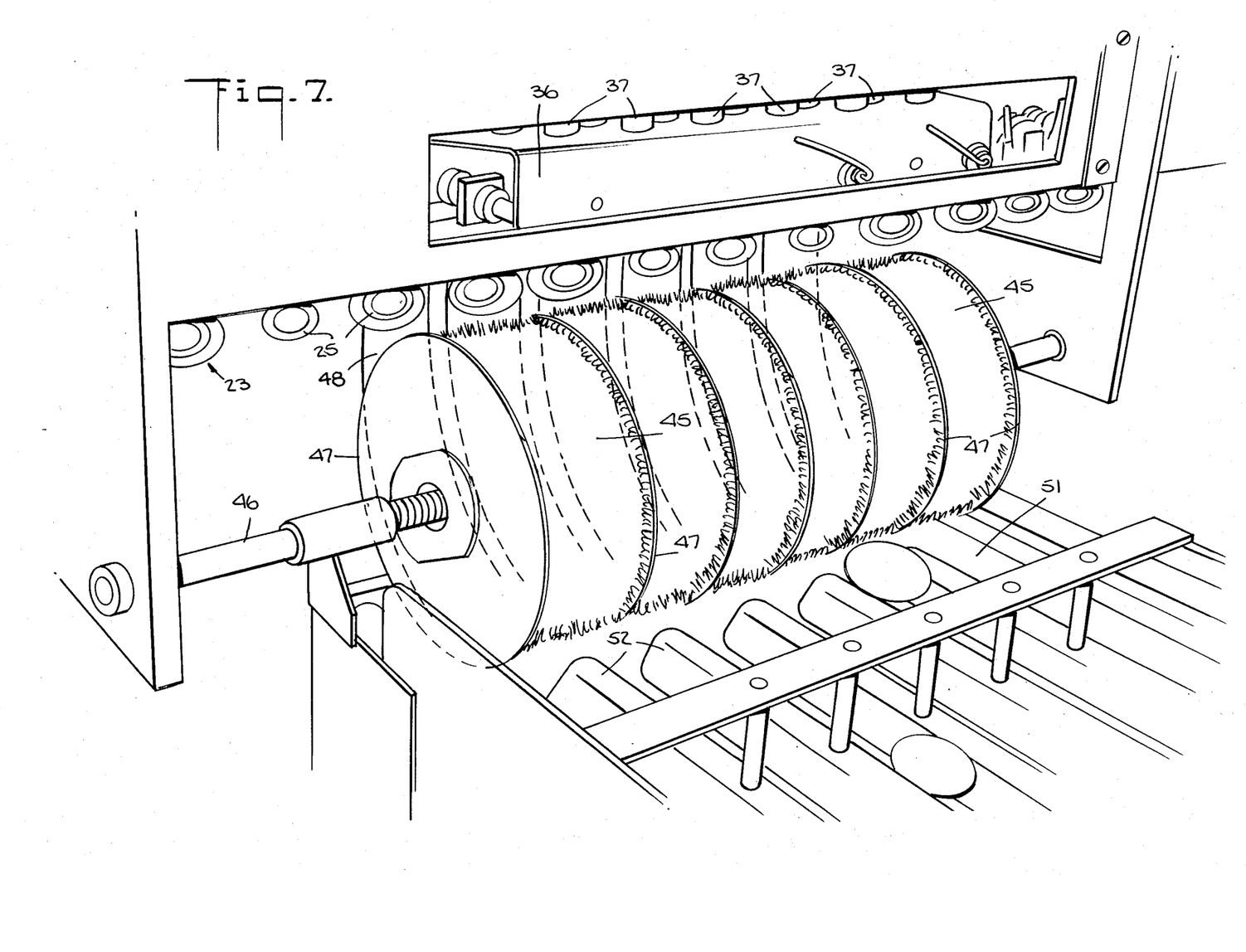
FIG. 7 is a perspective view of the receiving station of an egg grading system utilizing another embodiment of the improved egg handling system of the present invention.
Figure 8:
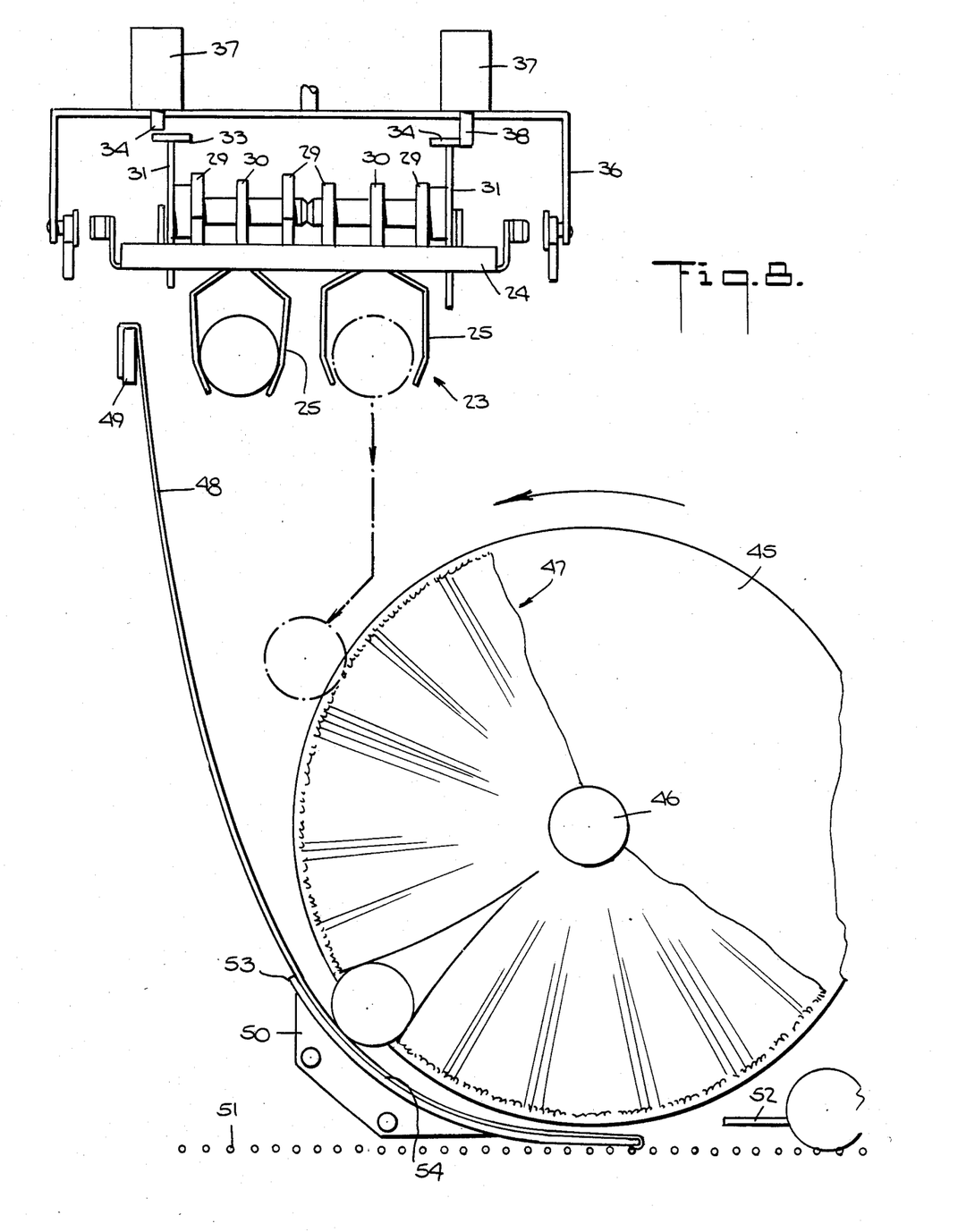
FIG. 8 is a cross-sectional view of the receiving station illustrated in FIG. 7.

FIGS. 7 and 8 illustrate another embodiment of the handling system of the invention in which frame 36 is disposed over a single rotatable resilient cylinder 45 mounted on a drive shaft 46. A plurality of rotatable disks 47 are also mounted on shaft 46 and define a plurality of channels for receiving eggs from the carriage assemblies 23. The cylinder is disposed below frame 36 and carriage assemblies 23 and has its peripheral edge disposed generally contiguous and slightly spaced from a plurality of elongated flexible guide members 48, each of which may comprise a sheet of mylar plastic, fixed at one end to a stationary rail 49 disposed adjacent the egg conveyor and at the other end over the vertical lower end of a stationary, rigid, arcuate-shaped support member 50 disposed beneath the lower end of the cylinder. Conveyor belt 51 is disposed below the cylinder for conveying eggs received thereon to an egg packer (not shown) which packs the eggs into cartons or trays as desired and is divided into a plurality of channels aligned with the disks 47 by means of a plurality of elongated stationary guide members 52 which are upwardly convex in shape and are suspended over the conveyor belt in close proximity thereto. Suitable drive means, such as an electric motor, is coupled to shaft 46 for rotating the cylinder so that the peripheral end thereof rotates downwardly and away from carriage assemblies 23, i.e., in a counter-clockwise direction. As can be readily seen in FIG. 8, guide member 50 has an upper lip 53 disposed below shaft 46 about which cylinder 45 rotates and includes an egg-supporting surface 54 which is disposed beneath and spaced from the peripheral edge of the cylinder. This surface is curved in a direction substantially in conformance with that of the cylinder (i.e., parallel thereto) in order to maintain contact between the cylinder and the eggs guided along members 48 and 50 onto conveyor 51. The cylinder may, as previously described with reference to FIGS. 1-6, comprise a rotating brush fabricated from nylon bristles. Also, other resilient members such as foam, inflatable means or the like may also be utilized.

In operation, eggs are carried by the prongs 25 of carriage assemblies 23 until they reach a receiving station of the egg grader. When the eggs arrive above the appropriate station, solenoids 37 are selectively actuated as previously described so that plungers 34 of solenoids 37 engage the upper T-sections 33 of extension bars 31 and cause the bars to rotate in a counter-clockwise direction (i.e., in a direction opposite to that of their movement by the egg conveyor) about shaft 28, thereby releasing the eggs from the carriage assemblies. The eggs then drop downwardly as shown in FIG. 8, and are caught by cylinder 45 and members 48 and 50. More specifically, the eggs are released prior to the receiving station, dependent upon the operating speed of the machine as more particularly described in the application entitled "Egg Processing System". The cylinder then carries the eggs downwardly and outwardly away from carriage assemblies 23 into the channels of conveyor 51.

It should be noted that although a plurality of elongated guide members 50 have been illustrated in the drawings, a single elongated sheet member could also be used in conjunction with cylinder 45 to catch and guide the eggs released from the carriage assemblies toward conveyor 51. With respect to either embodiment of the handling system, the position of frame 36 with respect to the cylinder is determined by taking into consideration the forward drop trajactory of the eggs, if any, as they are released by the carriage assemblies resulting from the forward speed of the egg conveyor.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An apparatus for transferring eggs continuously conveyed in spaced-apart, aligned relationship by a conveyor means to a receiving station in an egg grading apparatus at which the eggs are collected and packaged according to their physical characteristics, comprising, conveyor means including carrier members coupled thereto for conveying adjacently spaced rows of eggs in a spaced-apart aligned relationship, rotatable, resilient receiving means disposed at said receiving station below said conveyor means and having the peripheral edge thereof disposed at the approximate centerline of the adjacently spaced rows of eggs, said receiving means being adapted for rotational movement downwardly and away from said conveyor means for receiving eggs delivered by said conveyor means to said receiving station, said receiving means comprising rotatable, resilient cylinder means having a plurality of spaced-apart disk means forming a plurality of channels in said cylinder means for receiving said eggs, said carrier members being selectively actuated to release the eggs so that the eggs from both said adjacently spaced rows of eggs carried by said conveyor means fall onto and are received by respective ones of the channels of said cylinder means, and support means, disposed below said rotatable, resilient receiving means, for guiding eggs delivered to said receiving means downwardly and away from said receiving means.

2. The apparatus recited in claim 1, wherein said rotatable, resilient cylinder means comprises rotatable, resilient, cylindrical brush means.

3. The apparatus recited in claim 1, wherein said support means extends along substantially the entire axial length of said rotatable, resilient cylinder means.

4. The apparatus recited in claim 3, wherein said rotatable resilient receiving means comprises a pair of rotatable resilient cylinder means adapted for rotational movement in opposite directions towards one another and having the peripheral edges thereof disposed in contiguous relationship for receiving eggs delivered by said conveyor means to said receiving station between said contiguous peripheral edges of said cylinder means.

5. An apparatus for transferring eggs continuously conveyed in spaced-apart, aligned relationship by a conveyor means to a receiving station in an egg grading apparatus at which the eggs are collected and packaged according to their physical characteristics, comprising, conveyor means including carrier members coupled thereto for conveying adjacently spaced rows of eggs in a spaced-apart aligned relationship, rotatable, resilient cylindrical receiving means disposed at said receiving station below said conveyor means and having the peripheral edge thereof disposed at the approximate centerline of the adjacently spaced rows of eggs, said receiving means being adapted for rotational movement downwardly and away from said conveyor means for receiving eggs delivered by said conveyor means to said receiving station, said carrier members being selectively actuated to release the eggs so that the eggs from both said adjacently spaced rows of eggs carried by said conveyor means fall onto and are received by said cylindrical receiving means, support means, disposed below said rotatable, resilient receiving means, for guiding eggs delivered to said receiving means downwardly and away from said receiving means, and a second conveyor means disposed at said receiving station below said first conveyor means, said cylindrical means being disposed at said receiving station between said first and second conveyor means, and said support means being disposed below the peripheral edge of said cylindrical means and above said second conveyor means for guiding eggs away from said cylindrical means to said second conveyor means, said second conveyor means comprising means for conveying said eggs away from said receiving means in a number of rows which is greater than the number of adjacent rows of eggs carried by said first conveyor means.

6. The apparatus recited in claim 5, wherein said rotatable, resilient cylindrical means are disposed on a rotatable axle means, and wherein said support means is inclined at an angle with respect to said second conveyor means.

7. The apparatus recited in claim 5, wherein said support means comprises an elongated strip member extending downwardly from a point adjacent and beneath the peripheral edges of said cylinder means, said strip member having the vertical upper edge disposed above the centerline of axle means of said cylinder means so that said cylinder means maintains contact with eggs guided along said strip member to said second conveyor means, said strip member being curved in a direction substantially in conformance with the peripheral edge of said cylinder means.

8. An apparatus for delivering eggs to a receiving station in an egg grading apparatus at which the eggs are packaged according to their individual physical characteristics, comprising:

first conveyor means including a plurality of releasable egg-engaging means for continuously conveying and delivering a plurality of eggs in a first direction in spaced-apart aligned relationship to the receiving station, rotatable, resilient receiving cylinder means disposed at the receiving station, said receiving means being adapted for rotational movement downwardly and away from said conveyor means for receiving eggs delivered by said conveyor means to said receiving station, said cylinder means having an axis substantially parallel to said first direction, support means, disposed below said receiving means, for guiding eggs delivered to said receiving means downwardly and away from said receiving means and in a direction substantially perpendicular to said first direction, means, disposed at said receiving station adjacent to said egg-engaging means of said conveyor means so as to release eggs carried by said egg-engaging means in a predetermined sequence into said receiving means at said receiving station and second conveyor means comprising means for conveying said eggs away from said receiving means in a number of rows which is greater than a number of rows of eggs carried by said first conveyor means.

9. The apparatus recited in claim 8, wherein said first conveyor means includes two adjacently spaced rows of eggs.

10. The apparatus recited in claim 9, wherein said rotatable, resilient cylinder means comprises rotatable, resilient cylindrical brush means and includes a plurality of spaced-apart disk means forming a plurality of channels in said cylinder means.

11. The apparatus recited in claim 10, wherein said support means extends along substantially the entire axial length of said rotatable, resilient cylinder means.

12. The apparatus recited in claim 8, wherein said actuating means comprises solenoid-actuated plunger means movable into the path of said egg-engaging means as said egg-engaging means are conveyed by said conveyor means to said receiving station so as to open said egg-engaging means, thereby releasing eggs carried by said egg-engaging means in said predetermined sequence into said receiving means at the receiving station.

13. The apparatus recited in claim 12, wherein said conveyor means includes a plurality of carriage assembly means disposed in spaced-apart relationship with respect to one another, said releasable egg-engaging means being mounted on said carriage assembly means and comprising a plurality of pairs of downwardly depending egg-engaging members for engaging said eggs carried by said carriage assembly means.

14. The apparatus recited in claim 13, wherein said carriage assembly means includes a pivotally movable bar member coupled to said egg-engaging members for opening said members and wherein said solenoid-actuated plunger means are movable into the path of said pivotally movable bar members so as to engage said bar members and open said egg-engaging members, thereby releasing eggs carried by said carriage assembly means into said receiving means at the receiving station.

15. The apparatus recited in claim 12, further comprising frame means disposed at said receiving station adjacent said conveyor means, said solenoid-actuated plunger means being mounted on said frame means.

16. The apparatus recited in claim 8, wherein said second conveyor means comprises means disposed adjacent and below said receiving means at the receiving station and including a plurality of channel means for conveying eggs individually in rows away from said receiving means and wherein said first conveyor means is adapted to convey said eggs to said receiving station at a speed greater than that at which said second conveyor means conveys eggs away from said receiving means.

17. The apparatus recited in claim 16, wherein said receiving means each comprises rotatable, resilient cylinder means including a plurality of rotatable, spaced-apart disk means forming a plurality of channels in said cylinder means each disposed in alignment with said channel means of said second conveyor means.

18. The apparatus recited in claim 16, wherein said releasing means is adapted to release eggs from said egg-engaging means of said first conveyor means successively into said receiving means so that said eggs are successively transferred by said receiving means to said channel means of said second conveyor means.

19. An apparatus for delivering eggs to a receiving station in an egg grading apparatus at which the eggs are packaged according to their physical characteristics, comprising:

first conveyor means including a plurality of releasable egg-engaging means for continuously conveying and delivering a plurality of eggs in a first direction in spaced-apart, aligned relationship to the receiving station, rotatable resilient receiving means disposed at the receiving station and including a pair of rotatable resilient cylinder means adapted for rotational movement in opposite directions toward one another and having the peripheral edges thereof disposed in a generally contiguous interference relationship for receiving eggs delivered by said conveying means to said receiving station between said contiguous peripheral edges of said cylinder means, said cylinder means each having an axis substantially parallel to said first direction, a second conveyor means disposed at said receiving station below said first conveyor means, said cylinder means being disposed at said receiving station between said first and second conveyor means, support means, disposed below said receiving means, for guiding eggs delivered to said receiving means downwardly and away from said receiving means and in a direction substantially perpendicular to said first direction, said support means being disposed below said contiguous peripheral edges of said cylinder means and above said second conveyor means for guiding eggs delivered between said contiguous peripheral edges of said cylinder means away from said cylinder means to said second conveyor means, and means, disposed at said receiving station adjacent to said first conveyor means, for selectively actuating said releasable egg-engaging means of said conveyor means so as to release eggs carried by said egg-engaging means in a predetermined sequence into said receiving means at said receiving station.

20. The apparatus recited in claim 19, wherein said rotatable, resilient cylinder means are disposed on adjacent spaced-apart rotatable axle means, and wherein said support means is inclined at an angle with respect to said second conveyor means toward one of said axle means.

21. The apparatus recited in claim 19, wherein said cylinder means is disposed beneath a plurality of eggs delivered to said receiving station by said first conveyor means, and wherein said support means is disposed adjacent said contiguous peripheral edges of said cylinder means for guiding eggs delivered to said cylinder means downwardly and away from said cylinder means to said second conveyor means.

22. The apparatus recited in claim 19, wherein said support means extends along substantially the entire length of said rotatable cylinder means and comprises an elongated strip member extending downwardly adjacent and beneath said contiguous peripheral edges of said cylinder means and has a vertically upper edge disposed above the rotational axes of said axle means adjacent said contiguous peripheral edges of said cylinder means so that said cylinder means maintains contact with eggs guided along said strip member to said second conveyor means.

23. The apparatus recited in claim 22, wherein said strip member is curved in a direction substantially in conformance with said contiguous peripheral edges of said cylinder means.

24. An apparatus for delivering eggs to a receiving station in an egg grading apparatus at which the eggs are packaged according to their individual physical characteristics, comprising:
 first conveyor means including a plurality of releasable egg-engaging means for continuously conveying and delivering a plurality of eggs in a first direction in adjacent rows of spaced-apart eggs to the receiving station,
 a rotatable, resilient receiving cylinder means having an axis substantially parallel to said first direction disposed at the receiving station, said receiving means being adapted for rotational movement downwardly and away from said conveyor means for receiving eggs delivered by said conveyor means to said receiving station, said cylinder means receiving eggs from both said adjacently spaced rows of eggs carried by said first conveyor means, and moving the eggs in a direction substantially perpendicular to said first direction,
 guide means disposed below said first conveyor means and adjacent the peripheral edge of said rotatable resilient receiving means and having the lower portion thereof curved toward and in general conformance to the peripheral edge of said receiving means,
 means, disposed at said receiving station adjacent to said conveyor means, for selectively actuating said releasable egg-engaging means of said conveyor means so as to release eggs carried by said egg-engaging means in a predetermined sequence into said receiving means at said receiving station, whereby the eggs from both said adjacently spaced rows of eggs carried by said first conveyor means fall onto and are received by said receiving cylinder means in a number of rows which is greater than the number of rows of eggs carried by said first conveyor means and are moved away from said first conveyor means and
 second conveyor means for conveying said eggs away from said receiving means in a number of rows which is greater than the number of adjacent rows of eggs carried by said first conveyor means.

25. The apparatus recited in claim 24, wherein said first conveyor means includes two adjacently spaced rows of eggs.

26. The apparatus recited in claim 25, wherein said rotatable, resilient cylinder means comprises rotatable, resilient cylindrical brush means and includes a plurality of spaced-apart disk means forming a plurality of channels in said cylinder means.

27. The apparatus recited in claim 25, wherein said guide means depends downward from said first conveyor means and toward the peripheral edge of said cylinder means and is spaced therefrom so as to facilitate guiding eggs delivered to said cylinder means downward and away therefrom.

28. A method of transferring eggs delivered in spaced-apart aligned relationship by a first conveyor means to a receiving station, comprising the steps of,
 delivering eggs to said receiving station in parallel spaced-apart rows on said first conveyor means,
 releasing eggs from said first conveyor means at the receiving station in accordance with a predetermined requirement,
 positioning a receiving means below the first conveyor means so as to receive therein and deliver to a common member the eggs released from the parallel spaced-apart rows of the first conveyor means,
 receiving said eggs in the receiving means disposed at said receiving station whereby the released eggs from both said parallel spaced apart rows of eggs fall on and are received by said receiving means,
 rotating the receiving means downwardly and away from said first conveyor means to urge the received eggs downwardly,
 guiding said eggs received in said receiving means downwardly and away from said receiving means, and
 conveying said eggs away from said receiving means on second conveyor means,
 said step of releasing comprising releasing said eggs successively from said first conveyor means at said receiving station along the length of said receiving means, and said step of conveying comprising conveying said eggs individually in rows away from said receiving means on said second conveyor means.

29. The method recited in claim 28, wherein said step of receiving comprises receiving said eggs in a pair of rotatable, resilient receiving means adapted for rotational movement in opposite directions toward one another and having the peripheral edges thereof disposed in contiguous relationship, the eggs being received between said contiguous peripheral edges of said receiving means.

30. The method recited in claim 28, wherein said step of receiving comprises receiving said eggs in a single rotatable resilient receiving means adapted for rotational movement in a direction to urge the received eggs downwardly and having a guide means disposed adjacent the peripheral edge thereof so that the eggs released into the receiving means are urged downwardly by the single rotatable resilient receiving means with their directional movement being controlled by the guide means disposed adjacent thereto.

31. The method recited in claim 28, wherein the step of conveying comprises conveying said eggs away from said receiving means on said second conveyor means at a speed less than that at which eggs are conveyed to said receiving station by said first conveyor means.

32. The method recited in claim 28, wherein said step of conveying comprises conveying said eggs away from said receiving means on said second conveyor means in a number of rows which is greater than the number of said continuously moving rows of said first conveyor.

33. The method recited in claim 28, wherein said step of delivering comprises delivering eggs to said receiving station in a first direction in parallel spaced-apart rows of eggs and said step of receiving comprises receiving said eggs in a cylindrical receiving means having an axis disposed substantially parallel to said first direction whereby said eggs are urged by said receiving means downwardly and away from said conveyor means and in a direction substantially perpendicular to said first direction.

34. An apparatus for delivering eggs to a receiving station in an egg grading apparatus at which the eggs are packaged according to their individual physical characteristics, comprising:

first conveyor means including a plurality of releasable egg-engaging means for continuously conveying and delivering a plurality of eggs in a first direction in spaced-apart aligned relationship to the receiving station, receiving means having an axis substantially parallel to said first direction disposed at the receiving station below said first conveyor means and adapted for movement downwardly and away from said first conveyor means for receiving eggs delivered by said first conveyor means to said receiving station so as to move the eggs in a direction substantially perpendicular to said first direction, guide means disposed below said first conveyor means and said receiving means for guiding eggs delivered to said receiving means downwardly and away from said receiving means, means, disposed at said receiving station adjacent to said first conveyor means, for selectively actuating said releasable egg-engaging means of said first conveyor means so as to release eggs carried by said egg-engaging means in a predetermined sequence into said receiving means at said receiving station, whereby the eggs carried by said first conveyor means fall onto and are received by said receiving means and are moved away from said first conveyor means and second conveyor means for conveying said eggs away from said receiving means in a number of rows which is greater than a number of rows of eggs carried by said first conveyor means.

* * * * *